(12) United States Patent
Borrel

(10) Patent No.: US 10,317,226 B2
(45) Date of Patent: Jun. 11, 2019

(54) SYSTEM AND METHOD FOR POLLUTION MAPPING FROM VARIATIONS DATA

(71) Applicant: Rimalu Technologies, Inc., Scottsdale, AZ (US)

(72) Inventor: Herve Borrel, Scottsdale, AZ (US)

(73) Assignee: Rimalu Technologies, Inc., Scottsdale, AZ (US)

( * ) Notice: Subject to any disclaimer, the term of this patent is extended or adjusted under 35 U.S.C. 154(b) by 127 days.

(21) Appl. No.: 15/615,721

(22) Filed: Jun. 6, 2017

(65) Prior Publication Data

US 2018/0202824 A1 Jul. 19, 2018

Related U.S. Application Data

(60) Provisional application No. 62/447,416, filed on Jan. 17, 2017.

(51) Int. Cl.
| | | |
|---|---|---|
| *G08G 1/01* | (2006.01) | |
| *G01C 21/32* | (2006.01) | |
| *G01C 21/34* | (2006.01) | |
| *G06F 16/22* | (2019.01) | |
| *G08B 21/12* | (2006.01) | |
| *G06F 16/245* | (2019.01) | |

(52) U.S. Cl.
CPC ......... *G01C 21/3461* (2013.01); *G01C 21/32* (2013.01); *G08B 21/12* (2013.01); *G08G 1/012* (2013.01); *G08G 1/0112* (2013.01); *G08G 1/0129* (2013.01); *G08G 1/0141* (2013.01); *G06F 16/22* (2019.01); *G06F 16/245* (2019.01)

(58) Field of Classification Search
None
See application file for complete search history.

(56) References Cited

U.S. PATENT DOCUMENTS

| | | | |
|---|---|---|---|
| 2011/0251800 A1* | 10/2011 | Wilkins | G01J 3/02 702/24 |
| 2012/0166022 A1* | 6/2012 | Kwon | G01N 33/0075 701/2 |
| 2012/0293315 A1* | 11/2012 | Schunder | G08G 1/096775 340/438 |
| 2013/0080053 A1* | 3/2013 | Rakshit | G01C 21/3461 701/527 |
| 2014/0039988 A1* | 2/2014 | Londergan | G06Q 30/0207 705/14.1 |
| 2015/0339811 A1* | 11/2015 | Zhong | G06T 7/0002 382/104 |
| 2017/0038088 A1* | 2/2017 | Korber | F24F 3/16 |
| 2017/0091350 A1* | 3/2017 | Bauer | G06F 17/5095 |
| 2018/0188050 A1* | 7/2018 | Duan | G01C 21/3461 |
| 2018/0321208 A1* | 11/2018 | Bai | G01N 33/0034 |

* cited by examiner

*Primary Examiner* — Rami Khatib
(74) *Attorney, Agent, or Firm* — Lightbulb IP, LLC

(57) ABSTRACT

A pollution mapping system and method utilizes relative pollution data or pollution variations to provide pollution maps, history, and other information relating to the same. The system may comprise a central server that receives pollution data for individual pollution events, and process the pollution data to generate information such as pollution maps, history, or notifications. Pollution data will be received from a multitude of sensors, typically as the sensors travel through traffic, and includes at least pollution variation amplitude, detection location, and detection time.

20 Claims, 3 Drawing Sheets

SYSTEM AND METHOD FOR POLLUTION MAPPING FROM VARIATIONS DATA

CROSS-REFERENCE TO RELATED APPLICATION

This application claims priority to U.S. Provisional Patent Application No. 62/447,416, filed Jan. 17, 2017.

BACKGROUND OF THE INVENTION

Field of the Invention

The invention relates to pollution mapping and in particular to pollution mapping from pollution variations data.

Related Art

Traffic pollution is a complex mixture of particles of various sizes, and gases. Gases present in traffic pollution are often categorized in, reducing gases, such as carbon monoxide (CO), volatile organic compounds (VOCs) and hydrocarbons (HCs), and oxidizing gases, such as nitrogen oxides (NOX).

Air Quality Sensor (AQS) modules have been assembled on high end European commercial automobiles since the late 1980s. These AQS modules are now used on a large number of mid-range European and Asian car models. AQS modules are sold by several European and Asian companies to tier one automotive suppliers or OEMs for factory installation during car assembly. They are usually installed outside the cabin, close to a cabin air intake, or even around the front bumper area. They are often based on dual sensors. One sensor detects the reducing gases (VOCs, hydrocarbons, etc.) and the other one detects the oxidizing gases (NOX, etc.). These AQS modules communicate with the car air conditioning (AC) system and issue recommendations to the AC processor to close the recirculation flap when the pollution is high, to keep the polluted air outside the cabin. When the air pollution decreases, an AQS module recommends the AC system to reopen the flap, to let some fresh air into the cabin. No indication is however usually given to the user as to when the flap is opened or closed. This AQS function usually only measures changes in aggregate pollution levels, as opposed to absolute pollutant concentrations. It is however sufficient to detect most traffic pollution peaks, and to therefore decrease the average pollution inside the cabin.

Use of semiconductor gas sensors, such as AQS modules, in vehicles has been documented. For instance, the following patents disclose systems and methods for pollution monitoring and mapping and route optimization.

Patent Application No. WO2015175304 describes systems and methods for generation of an air quality score.

U.S. Pat. No. 9,494,511 describes a system and apparatus for measurement and mapping of pollutants.

U.S. Pat. No. 8,744,766 describes dynamic route recommendation based on pollution data.

U.S. Patent Publication No. 2009/0309744 describes a system and method for detecting air pollution, planning routes and issuing warnings.

U.S. Patent Publication No 2010/0145569 describes a method and system for providing environmentally-optimized navigation routes.

Patent Application No. WO2015160830 describes a wearable sensor with multiple chemiresistors for crowdsourcing pollution data.

U.S. Pat. No. 8,903,646 describes a method for determining emission locations.

Patent Application Nos. DE2000143797 20000906 and WO2001EP09783 20010824 describe an integrated traffic monitoring system.

Patent Application No. FR20110061342 20111208 describes a method for calculating unpolluted route for road navigation system in car.

Patent Application No. JP20080146635 20080604 describes vehicle information device that controls air intake based on pollution map data communicating directly with car air conditioning system.

From the discussion that follows, it will become apparent that the present invention addresses the deficiencies associated with the prior art while providing numerous additional advantages and benefits not contemplated or possible with prior art constructions.

SUMMARY OF THE INVENTION

A pollution mapping system and methods therefor are disclosed herein. Various systems and methods are disclosed herein for processing pollution variation data from a multitude of mobile sensors in traffic. In general, these sensors detect pollution events based on peaks of pollution, and create an output that can be used by users to minimize their pollution exposure within a vehicle cabin.

The pollution mapping system allows traffic pollution maps and databases to be generated by using purely relative pollution data (data on pollution variations as opposed to data on absolute pollution levels, such as gas or particle concentrations). Such relative pollution information is easy to capture via low cost sensors that are commonly available in vehicles equipped with AQS modules.

Very high resolution real time traffic pollution maps may be generated with the pollution variation mapping system. Prior attempts to create such maps and information have been limited by the cost of deployment and an insufficient number of sensors. The present invention is therefore very advantageous.

In one or more embodiments, the pollution mapping system uses relative pollution data (i.e., pollution variations) associated with pollution events (peaks), typically including pollution event type (CO—HC or NOx detection), detection time, detection location, pollution variation amplitude, and pollution event duration. Sensor locations may be correlated or matched with known road map topology to reduce GPS errors or inaccuracies.

In operation, each pollution event may be associated with a point of interest comprising a defined area and time span. Air pollution indices may be generated based on the density of pollution events, amplitude of pollution events, or both over a particular area and time span. Adjustment of air pollution indices may occur based on the number of events received versus the number of sensors present in the same area and time span. A vehicle's speed may be taken into account to improve event location accuracy. A pollution history may be generated based on air pollution indices over time.

The pollution mapping system has a number of advantages. As stated, the pollution mapping system uses relative pollution data that can be made available in large volume and at low cost. The statistical processing of such pollution data increases reliability since a single bad reading is insufficient to create an erroneous output. No human intervention is needed because data is sent automatically and processed by a central server automatically.

In addition, the mapping density is very high as sensors onboard vehicles can collect a lot of data along their route. The mapping information provided by the pollution mapping system is particularly relevant to car occupants as it is exactly where the pollution would enter their car cabin and can be made readily available to many users via a cellular or internet connection. Users can use real time and historical pollution maps and information to reduce their exposure to traffic pollution by finding the least polluted route to their destination and closing their recirculation flap ahead of high polluted areas. The historical pollution maps can be used as a prediction tool, since the same pollution patterns are likely to repeat over days, weeks or months. The pollution maps or information can also be used by air quality institutions or municipalities to better understand pollution patterns and improve their road networks.

When it comes to reducing in-cabin pollution, pollution variations in traffic matter more than absolute background pollution levels, because car occupants can minimize cabin pollution by not letting the pollution peaks into their vehicle, or avoiding areas where there are a lot of pollution peaks. They cannot however usually escape the background urban pollution, because even if occupants close the recirculation flap all the time, some external air will eventually get into the vehicle. In addition, there are other issues linked to closing the recirculation flap all the time, such as the accumulation of $CO_2$ and humidity in the cabin.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Every year several million vehicles are manufactured with AQS modules. The current total installed base may be in the tens of millions of vehicles. The sensors in these AQS modules are typically low-cost metal oxide sensors that have a fast response time but low selectivity and accuracy. In general, these sensors output a signal that reflects the changes in aggregate pollution concentration, but does not allow direct extraction of information on absolute single gas concentration.

A system to create traffic pollution maps based on a multitude of AQSs on vehicles moving in traffic was described in U.S. patent application Ser. No. 15/154,732, filed May 13, 2016, which is incorporated herein by reference. It discloses systems and methods regarding collection of pollution data from large numbers of mobile sensors and how the resulting pollution map information can be made available to multitudes of users.

An exemplary embodiment of the pollution variation mapping system herein utilizes a plurality of sensors onboard vehicles in communication with one or more central servers. Pollution data collected by the sensors is typically sent several times per minute. For instance, this data may be embedded or encapsulated in one or more pollution event data packets, which are sent by the sensors onboard vehicles. A sensor will typically capture pollution variation data, such as the increase or decrease of pollution concentration, as opposed to absolute pollution levels. In some embodiments, a sensor may be an AQS.

Figure 1:
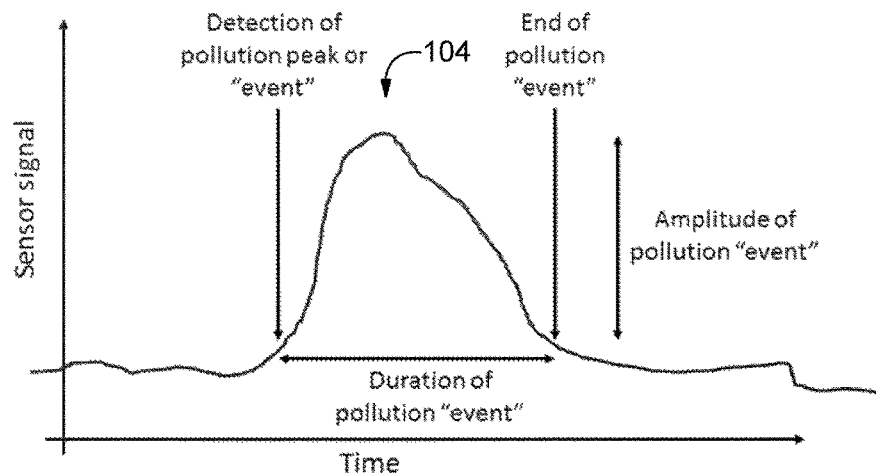
FIG. 1 illustrates exemplary sensor signal information and pollution events over time.
Figure 2:
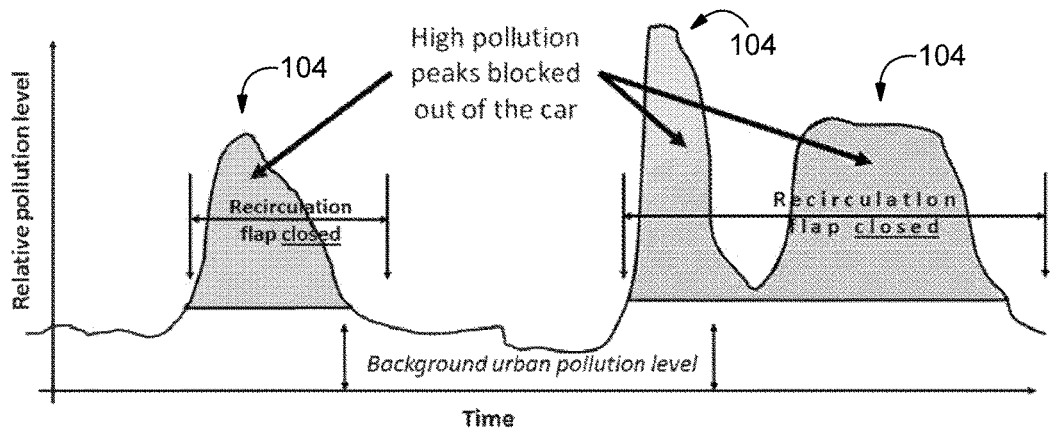
FIG. 2 illustrates exemplary sensor signal information and the effect of preventative action.
Figure 3:
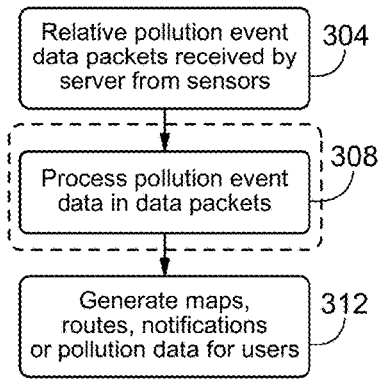
FIG. 3 is a flow diagram illustration operation of an exemplary central server.

Pollution data may include pollution event type, pollution event detection time, pollution event detection location, pollution event duration, pollution variation amplitude, name (or serial number or other identifier) of the sensor sending the data, or various subsets thereof. An indicator of the recent variability of the pollution data, such as in standard deviations, may be provided. FIGS. 1 and 2 illustrate exemplary signal information for a sensor over time, with pollution events 104 being defined as the peaks of the sensor signal. Pollution event data packets will typically be sent to and received by a central server, such as shown in step 304 of the flow diagram illustrating operation of a central server in FIG. 3.

Figure 4:
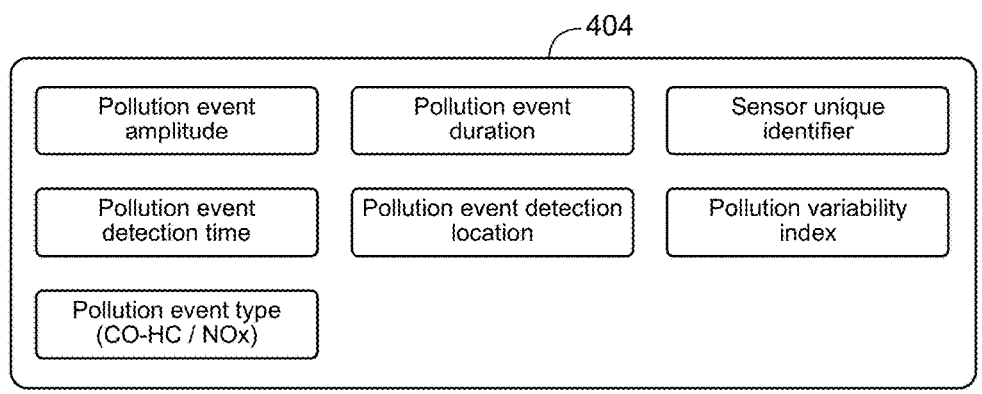
FIG. 4 is a block diagram illustration an exemplary pollution event data packet.

As shown in step 308, a central server may process all data received, such as in the form of pollution event data packets. An exemplary pollution event data packet 404 is illustrated in FIG. 4. Processing may occur in real time so a central server's output is valid at all times. A central server may also or alternatively associate each pollution event to a location, time span, or both by using pollution event detection location or pollution event detection time data, as well as pollution event duration data. This may be used to generate mapping information. A time span may be a period of time between two times or a single moment in time in one or more embodiments. It is contemplated that a date stamp, timestamp, datetime stamp, duration of time, or various combinations thereof may be used to represent a time span A central server may also calculate pollution indices based on the density and variation amplitude of pollution, as received over a certain area and time span and based on variability indicators. Pollution indices may be adjusted based on the number of pollution events received versus the number of sensors present in the same area and time span. In addition, pollution history may be calculated by a central server based on air pollution indices over time.

A central server may also receive regular information about a sensor signal variability, for example, in the form of a calculated standard deviation of the signal over the last 30 seconds. This number can, for example, be calculated and sent to the central server every 15 seconds. Such a variability indicator carries information about the local creation of pollution on a road segment, even if no significant pollution event was detected. This additional information can be used as a complement to the pollution events data, to refine the calculated maps.

Figure 5:
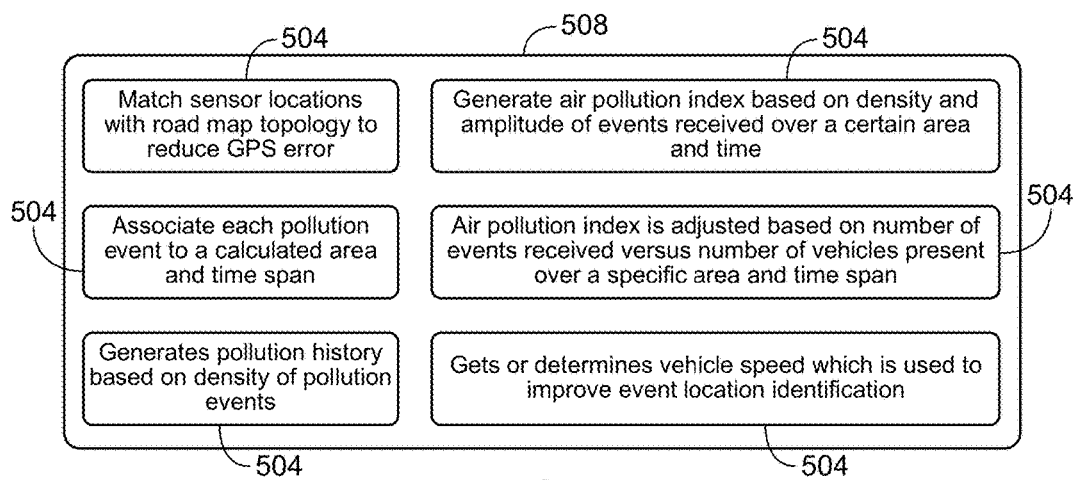
FIG. 5 is a block diagram illustrating exemplary operations of a central server.

Mapping information may be transmitted or otherwise made available to users via the internet or other wired or wireless networks or communication, such as shown in step 312. For instance, and as will be described further below, a central server may execute one or more sets of instructions 504 in the form of machine readable code 508 to generate mapping or other information, such as those shown in FIG. 5. Notifications or alerts may be sent to users approaching polluted area. Various other actions may be taken as well. For example, as shown in FIG. 2, a vehicle's recirculation flap may be closed when notified of a pollution event 104. It is noted that optimized travel routes may be requested by users whether they are on or off road.

In operation, a central server may, for example, define a location and time grid with a 15 yard pitch and a 30 second pitch. An air pollution index may be generated for each location/time point on this grid. In other words, an air pollution index may be generated for every 15 yards on a road, street, highway, or other path, every 30 seconds.

An air pollution index for a specific point of interest (i.e., a location or area, and time or time span of interest) on a grid may be determined by summing or counting all pollution events detected within plus or minus 30 yards (for example) of the point of interest, on the same path or on paths intersecting within 30 yards, and within plus or minus 60 seconds (for example) of the time of interest. Pollution events that are further away may be weighted with a smaller factor. For example, a weight of 1 may be used for all pollution events detected within 15 yards, and decrease to a weight of 40% for events detected 30 yards away.

A weighing may also be applied to time. For example, a weight of 1 may be used for pollution events within plus or minus 60 seconds, and decrease to a weight of 40% for pollution events detected 60 seconds before or after the time of interest. A higher weight may be applied to pollution events with a higher amplitude, for example by using three different amplitude ranges with a corresponding weight assigned to each.

A gross air pollution index may be generated by counting all weighted pollution events. That is, pollution events weighted with regards to amplitude, duration, distance and time. An additional weight may be used to take pollution event duration into account as well. For example, a longer pollution event may be weighted higher than a shorter one with the same amplitude.

All sensors present at a point of interest (i.e., sensors present over a distance and time span of interest) may be counted to get an indication of the significance (i.e., significance index) of the number of pollution events counted over that area and time span. For example, if 100 pollution events are detected by 50 sensors present over a point of interest, that indicates a higher density and therefore a higher significance of pollution events, as compared to 100 pollution events detected by 1000 sensors for the same point of interest. For each point (location and time) of calculation, adjust the gross air pollution index may be adjusted using the significance index, to obtain a publishable air pollution index.

The above example is applicable to generate a historical database of pollution indices for each location covered. The numbers, ranges, thresholds, and percentages, as well as the units of measure above are exemplary. It will be understood that such values and units of measure may be varied to generate mapping information with more or less resolution, or based on more or less data. It is contemplated that the values may be automatically adapted based on the number of sensors in an area and time span of interest in one or more embodiments.

For real time purposes, a central server may operate in a distinct manner. A central server may, for example, only utilize pollution events before the time of interest, and ignore pollution events occurring 60 seconds (or other period) after the time of interest. In this manner, a valid air pollution index can be made available to users immediately. A central server may also focus on generating mapping information only for significant pollution events immediately ahead of the user or along a user's path, to allow the user to take action to avoid pollution ahead of or along the path of the user.

The central server may receive regular information from each sensor regarding the local pollution variability index. This is an indication of how much the signal is varying as the car is driving on the road. This information is usually well correlated with higher overall pollution. In addition, such regular communication allows the central server to always know how many sensors are operational in a particular area and time span.

In one or more embodiments, a central server compares received pollution event detection location data with known road map topology to reduce GPS error. A central server may also calculate or determine each vehicle's speed to assign each pollution event more precisely to the right location. It is contemplated that a central server may receive raw sensor signals from a vehicle's pollution sensors and itself performs pollution event detection and identification, offloading the same from the vehicle.

Figure 6:
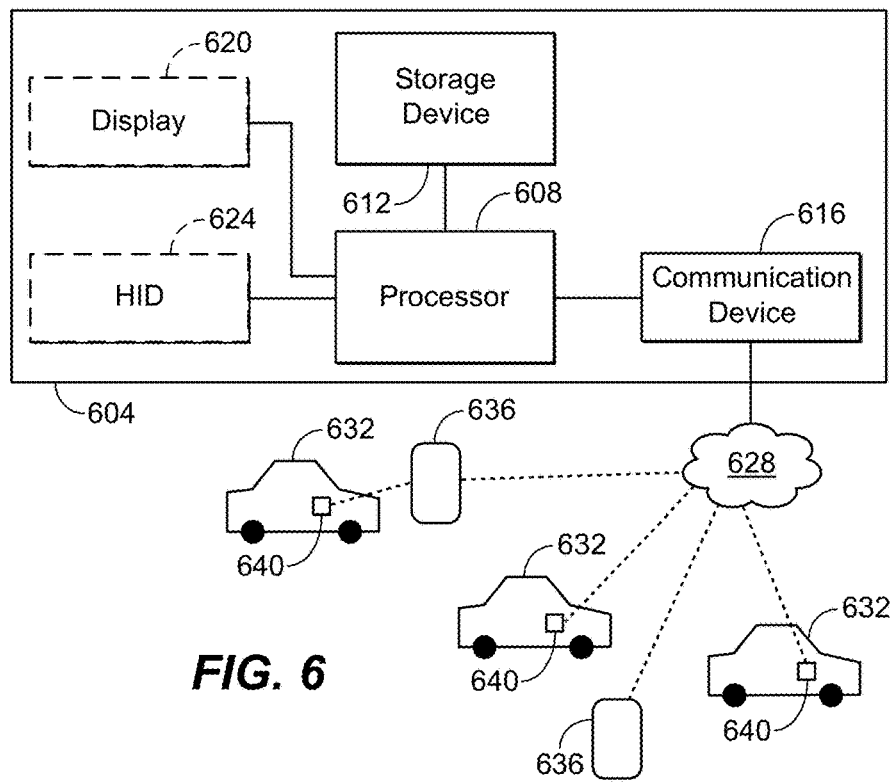
FIG. 6 is a block diagram illustrating an exemplary central server and environment of use.

FIG. 6 illustrates an exemplary central server 604 and environment of use. As can be seen, a central server 604 may comprise one or more processors 608, one or more storage devices 612, and one or more communication devices 616. A server 604 may optionally comprise one or more displays 620 and human interface devices 624 (e.g., keyboard, pointing device, speaker, and other human interface devices) such as to allow an operator or administrator to control operation of the server. It is contemplated that a central server 604 may be part of a cloud service.

A processor 608 may be a microprocessor or the like that executes machine readable code comprising one or more instructions to operate as disclosed herein. Some exemplary central server operations are shown in and described with regard to FIG. 5 for instance. Machine readable code may be stored on a non-transient storage medium (not including carrier waves and electronic signals transmitted via wired or wireless communication links). For instance, the machine readable code may be stored on a storage device 612 of or accessible to a central server 604.

A storage device 612 may be an optical, magnetic, flash or other drive accessible to a central server 604 in one or more embodiments. A storage device 612 may also or alternatively store pollution event data and the mapping and other information generated therewith.

A communication device 616 may be used to communicate with sensors 640, client devices 636, or other devices, such as via one or more communication networks 628. A communication device 616 may be arranged to communicate via wired or wireless connections. Typically, communication will occur wirelessly as illustrated by the broken line connections of FIG. 6. A mobile transmitter, transceiver, or other mobile communication device may be used by a sensor 640 to communicate pollution event data packets or other data with a communication device 616 of a central server 604. It is contemplated that the mobile transmitter or transceiver may be included in a vehicle 632, client device 636, or with a sensor 640 in one or more embodiments. For example, a mobile transceiver may be a cellular or other modem in some embodiments.

As described above, pollution event data packets, mapping information, notifications, alerts and other pollution information may be communicated during operation of the pollution mapping system herein. Data captured by a sensor 640 may be first transmitted to a client device 636, and then be relayed to a central server via a mobile communication device of the client device. This transmission of data from a sensor 640 may occur via a local wired or wireless communication link between a sensor and a client device 636. GPS or location data may be obtained from a standalone GPS device, the vehicle's own GPS, or a client device 636. In operation, a client device 636 may combine location, sensor, and other data to generate pollution event data packets for transmittal to a central server 604.

A client device 636 may be a standalone device, such as a smartphone, tablet, laptop, or other mobile computing device. Alternatively, a client device 636 may be part of a vehicle, such as a vehicle's entertainment, navigation, stereo, or other onboard computer system. A client device 636 will typically utilize its processor in generating pollution event data packets, and its display, speakers, or other output device(s) to present mapping information, pollution information, routes, notifications, or the like to users. In another embodiment, the central server 604 receives raw sensor signals directly from one or more sensors 640, via a communication device 616, without being processed beforehand to create pollution event data packets. In this case, the central server 604 performs all the processing including the extraction of the pollution event data packets from the raw sensor signals.

Notifications, mapping information, or other information stored by a central server 604 may be retrieved via a communication device 616 as well. As can be seen, a standalone or vehicular client device 636 may communicate with a central server 604 for such purposes via one or more communication networks 628.

Figure 7:
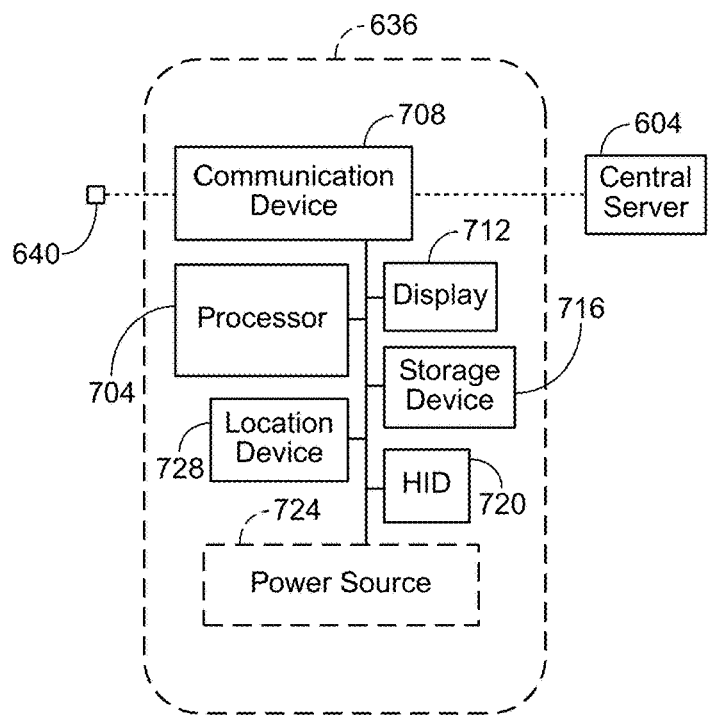
FIG. 7 is a block diagram illustrating an exemplary client device.

FIG. 7 is a block diagram illustrating an exemplary client device 636. As can be seen, a client device 636 may comprise one or more processors 704, storage devices 716, and mobile communication devices 708. A processor 704 may execute machine readable code comprising one or more instructions fixed on a non-transient storage medium (not including carrier waves and electronic signals transmitted via wired or wireless communication links) to operate as disclosed herein. In one or more embodiments, the machine readable code may be stored on a storage device 716 of the client device 636, such as a flash or other drive of the client device.

As described above, a mobile communication device 708 may be used to communicate with a central server 604, sensor 640 or both. For example, a mobile communication device 708 may communicate via a local BLUETOOTH or other wireless connection with a sensor 640, and the same or another mobile communication device 708 of a client device 636 may communicate with a central server 604 via a cellular data connection.

A location device 728, such as a GPS receiver, may detect a current location for inclusion in a pollution event data packet. A processor 704 may generate a pollution event data packet with data from one or more sensors 640, location devices 728, or both. Location data may include GPS coordinates, altitude, compass, and vehicle speed information. It is noted that a location device 728 may be part of a sensor 640 or vehicle, or be a standalone device in one or more embodiments.

A client device 636 will typically also include one or more display 712 or other output device(s) and one or more HIDs 720 to present information to user and to allow user interaction. Notifications, mapping information, and other information may be presented via a display 712 or other output device of a client device 636. A user may interact with such information and request particular information from a central server 604 using a client device's HID 720.

In some embodiments, a client device 636 may have a power source 724, such as a battery. Typically, a power source 724 will be provided for handheld computing devices such as smartphones, tablets, or laptops. Client devices 636 that are part of a vehicle may utilize the vehicle's power source and therefore need not have an integrated power source 724. A standalone client device 636 may be charged or powered with an external power source as well.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A method for generating high resolution traffic pollution maps from a plurality of pollution events comprising pollution variations detected by a plurality of vehicle-mounted sensors, the method comprising:

for each of the plurality of pollution events, receiving pollution data comprising a pollution variation amplitude, location of detection, time of detection, location of end of the pollution event, and time of end of the pollution event, wherein the pollution variation amplitude is detected by the plurality of vehicle-mounted sensors and the pollution variations are relative to time;

calculating a duration of the pollution event;

grouping the plurality of pollution events into a plurality of points of interest based on the location of detection and time of detection, each of the plurality of points of interest comprising an area and time span;

assigning a weight to each of the plurality of pollution events based on the pollution variation amplitude of the pollution event, the duration of the pollution event, or both;

generating a gross air pollution index for each of the plurality of points of interest based on the weight assigned to each of the plurality of pollution events; and transmitting the gross air pollution index for at least one of the plurality of points of interest in the form of one or more high resolution traffic pollution maps to one or more client devices onboard one or more vehicles for use in reducing exposure to pollution at the one or more vehicles.

2. The method of claim 1 further comprising:

determining a number of the plurality of pollution events in each of the points of interest;

generating a count of a subset of the plurality of sensors located within the area and time span of each of the plurality of points of interest;

generating a significance index using a ratio of the number of the plurality of pollution events compared to the count of the subset of the plurality of sensors; and adjusting the gross air pollution index using the significance index.

3. The method of claim 2, wherein the count is generated by counting the subset of the plurality of sensors located within the area and the time span of each of the plurality of points of interest.

4. The method of claim 1, wherein the weight is reduced when the location of detection or time of detection of the pollution event is beyond a predefined distance or time threshold, respectively, from at least one of the plurality of points of interest.

5. The method of claim 1, wherein the gross air pollution index is presented in a map on a display of the one or more client devices.

6. The method of claim 1 further comprising improving accuracy of the location of detection by comparing the location of detection to preexisting road topology information.

7. The method of claim 1 further comprising storing the gross air pollution index for each of the plurality of points of interest to generate a pollution history.

8. The method of claim 7, wherein at least a portion of the pollution history is transmitted to the one or more client devices for use in reducing exposure to pollution at the one or more vehicles.

9. A method for generating traffic pollution maps from a plurality of pollution comprising pollution variations detected by a plurality of vehicle-mounted sensors comprising:

for each of the plurality of pollution events, receiving pollution data comprising a pollution variation amplitude, location of detection, and time of detection, wherein the pollution variation amplitude is detected by the plurality of vehicle-mounted sensors and the pollution variations are relative to time;

grouping the plurality of pollution events into a plurality of points of interest based on the location of detection and time of detection, each of the plurality of points of interest comprising an area and time span;

assigning a weight to each of the plurality of pollution events based on the pollution variation amplitude of the pollution event;

determining a number of the plurality of pollution events in each of the points of interest;

generating a gross air pollution index for each of the points of interest based on the weight assigned to each of the plurality of pollution events;

generating a count of a subset of the plurality of sensors located within the area of each of the plurality of points of interest;

generating a significance index using a ratio of the number of the plurality of pollution events compared to the count of the subset of the plurality of sensors;

adjusting the gross air pollution index using the significance index; and transmitting the gross air pollution index for at least one of the plurality of points of interest in the form of one or more high resolution traffic pollution maps to one or more client devices for use in reducing exposure to pollution.

10. The method of claim 9, wherein the weight is reduced when the location of detection or time of detection of the pollution event is beyond a predefined time or distance threshold.

11. The method of claim 9, wherein the gross air pollution index is presented in a map on a display of the one or more client devices.

12. The method of claim 9 further comprising improving accuracy of the location of detection by comparing the location of detection to preexisting road topology information.

13. The method of claim 9 further comprising storing the gross air pollution index for each of the plurality of points of interest to generate a pollution history.

14. The method of claim 9, wherein the gross air pollution index is generated only for a subset of the plurality of points of interest along a predefined path.

15. The method of claim 9, wherein the count is generated by counting the subset of the plurality of sensors located within the area and the time span of each of the plurality of points of interest.

16. Machine readable code fixed on a non-transient storage medium that, when executed, cause one or more central servers to generate a plurality of high resolution traffic pollution maps from a plurality of pollution events comprising pollution variations detected by a plurality of vehicle-mounted sensors by:

for each of the plurality of pollution events, receiving pollution data comprising a pollution variation amplitude, location of detection, and time of detection for a plurality of pollution events, wherein the pollution variation amplitude is detected by the plurality of vehicle-mounted sensors and the pollution variations are relative to time;

group the plurality of pollution events into a plurality of points of interest based on the location of detection and time of detection, each of the plurality of points of interest comprising an area and time span;

assign a weight to each of the plurality of pollution events based on the pollution variation amplitude of the pollution event;

generate a gross air pollution index for each of the plurality of points of interest based on the weight assigned to each of the plurality of pollution events; and transmit the gross air pollution index for at least one of the plurality of points of interest in the form of one or more high resolution pollution maps to one or more client devices for use in reducing exposure to pollution.

17. The machine readable code of claim 16, wherein, when executed, the machine readable code causes the one or more central servers to determine a least polluted route between a first location and a second location.

18. The machine readable code of claim 16, wherein, when executed, the machine readable code causes the one or more central servers to determine a route pollution index for one or more routes.

19. The machine readable code of claim 16, wherein, when executed the machine readable code causes the one or more central servers to generate an air pollution variability index for each of the plurality of points of interest.

20. The machine readable code of claim 16, wherein, when executed, the machine readable code causes the one or more central servers to store the gross pollution index and the time span for the plurality of points of interest to generate a history of pollution data.

* * * * *